UNITED STATES PATENT OFFICE.

THOMAS LAW, OF MOULTON, IOWA.

PLASTIC COMPOUND TO BE USED IN THE MANUFACTURE OF BURIAL-CASKETS, FURNITURE, &c.

SPECIFICATION forming part of Letters Patent No. 336,726, dated February 23, 1886.

Application filed October 16, 1885. Serial No. 180,086. (No specimens.)

*To all whom it may concern:*

Be it known that I, THOMAS LAW, of Moulton, in the county of Appanoose and State of Iowa, have invented a new and Improved Plastic Compound, of which the following is a full, clear, and exact description.

The object of my invention is to provide a new and improved plastic compound or mixture to be used in the manufacture of burial-caskets, furniture, and various kinds of ornamental articles, &c.

The composition consists of the following ingredients mixed in the proportions given herewith: rosin, one part; black lead, one part; sulphur, one part; rubber, one-fourth part. These ingredients are melted and thoroughly mixed, and are then shaped or molded in suitable molds or by means of suitable dies. The mass hardens rapidly, and is then very durable and lasting. It can be pressed very easily in any mold, and gives very clear and sharp contours.

The said compound is thoroughly waterproof and imperishable. It also forms an excellent cement, and anything inclosed in the compound can be hermetically sealed without the use of any other sealing material.

Having thus described my invention, what I claim as new, and desire to secure by Letters Patent, is—

The herein-described plastic mass or composition, consisting of the following ingredients—namely, rosin, black lead, sulphur, and rubber, about in the proportions given, substantially as set forth.

THOMAS LAW.

Witnesses:
L. W. CRAWFORD,
JESSE BROWN.